United States Patent [19]

Vold

[11] 4,007,412
[45] Feb. 8, 1977

[54] COMBINED MEANS FOR SENSING AN INERTIAL CONDITION AND FOR PROVIDING TORQUING AND DAMPING FUNCTIONS

[75] Inventor: Gunnar J. Vold, Mahwah, N.J.

[73] Assignee: The Bendix Corporation, Teterboro, N.J.

[22] Filed: Mar. 25, 1974

[21] Appl. No.: 454,335

[52] U.S. Cl. .............................. 318/676; 318/687; 318/662
[51] Int. Cl.² ...................................... G05B 11/01
[58] Field of Search ........... 318/676, 687, 640, 662

[56] References Cited
UNITED STATES PATENTS

| | | | |
|---|---|---|---|
| 3,176,521 | 4/1965 | Clark | 318/676 X |
| 3,213,694 | 10/1965 | Clark et al. | 318/676 X |
| 3,359,471 | 12/1967 | Hart et al. | 318/676 X |
| 3,390,386 | 6/1968 | Cranch et al. | 318/676 X |
| 3,449,651 | 6/1969 | Cranch et al. | 318/676 X |
| 3,657,630 | 4/1972 | Fiet | 318/676 |
| 3,735,229 | 5/1973 | Brockmuller | 318/676 |
| 3,832,618 | 8/1974 | Levesque et al. | 318/676 |

*Primary Examiner*—B. Dobeck
*Attorney, Agent, or Firm*—Anthony F. Cuoco

[57] ABSTRACT

For use with an inertial sensing device such as a rate gyro, accelerometer or like device, combined means for sensing an inertial condition and for providing torquing and damping functions for controlling the response of the device to the condition.

6 Claims, 3 Drawing Figures

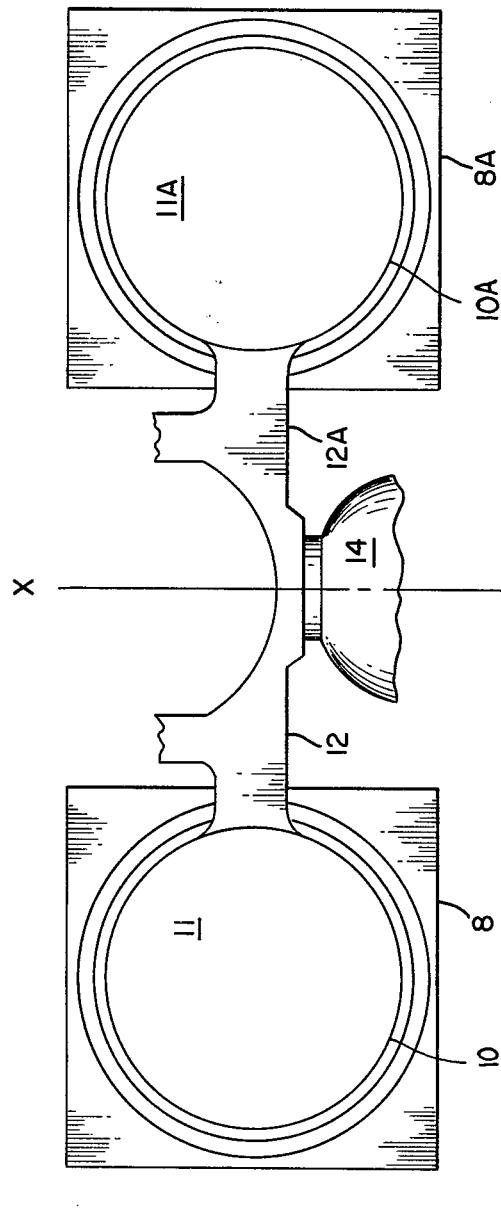
FIG. I
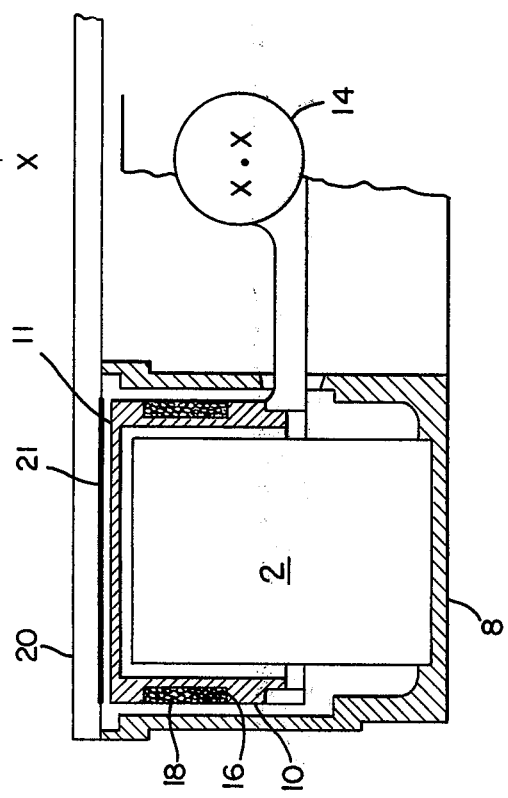
FIG. 2

COMBINED MEANS FOR SENSING AN INERTIAL CONDITION AND FOR PROVIDING TORQUING AND DAMPING FUNCTIONS

BACKGROUND OF THE INVENTION

1. Field of the Invention

This invention relates generally to inertial sensing devices and particularly to a device of the type which senses an inertial condition and which includes means for generating controlling torquing and damping functions. More particularly, this invention relates to a single structural arrangement for providing the sensing, torquing and damping functions.

2. Description of the Prior Art

In an inertial sensing instrument such as a conventional rate gyroscope or accelerometer, sensing, torquing and damping functions have been heretofore separately provided. For example, the sensing or pickoff function has been provided by a displacement device such as microsyn, a strain gage or a potentiometer. The torquing function has been provided by a restoring device such as a mechanical spring or a torquing motor and the damping function has been provided by a fluidic shearing mechanism, a gas piston or the more common eddy current device. In devices of this type cost reduction is difficult and the several components required detract from desired reliability.

SUMMARY OF THE INVENTION

This invention contemplates apparatus for use with an inertial sensor wherein sensing, torquing and damping functions are embodied in a single structural arrangement. A wound bobbin is energized for being magnetically coupled to a permanent magnet and capacitively coupled to a printed circuit board. The bobbin is coupled to the sensor for displacement relative to the magnet and circuit board in response to an inertial condition. The change in capacitance resulting from the displacement of the bobbin relative to the circuit board is a measure of the sensed condition. A force is developed as a result of the magnetic interaction of the windings on the bobbin and the magnet, and which force displaces the bobbin for providing the torquing function. Displacement of the bobbin in the magnetic field provides the damping function, the level of which corresponds to the rate of displacement of the bobbin with respect to the permanent magnet. The device of the invention is more economical to manufacture than devices now known in the art and since fewer components are involved a more reliable device is provided.

One object of this invention is to provide for use in an inertial sensing device, a single structural arrangement for providing condition sensing, torquing and damping functions so as to eliminate the need for separate elements as has heretofore been required, whereby a more economical and reliable device results.

Another object of this invention is to achieve the above by arranging a wound bobbin with a printed circuit board and a permanent magnet, with displacement of the bobbin relative to the magnet and circuit board in response to an inertial condition providing the sensing, torquing and damping functions.

Another object of this invention is to arrange the bobbin with the magnet so that when the bobbin winding is energized the interaction of the bobbin and magnet developes a restoring torque.

Another object of this invention is to provide a device of the type described wherein a damping function is provided which is a function of the rate of displacement of the bobbin with respect to the permanent magnet.

Another object of this invention is to provide a device of the type described wherein the bobbin and circuit board form a capacitor, with the displacement of the bobbin changing the capacitance of the capacitor as a function of the sensed condition.

The foregoing and other objects and advantages of the invention will appear more fully hereinafter from a consideration of the detailed description which follows, taken together with the accompanying drawings wherein an embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a top view illustrating the invention.
FIG. 2 is a sectioned front view illustrating the invention.

DESCRIPTION OF THE INVENTION

Figure 3:
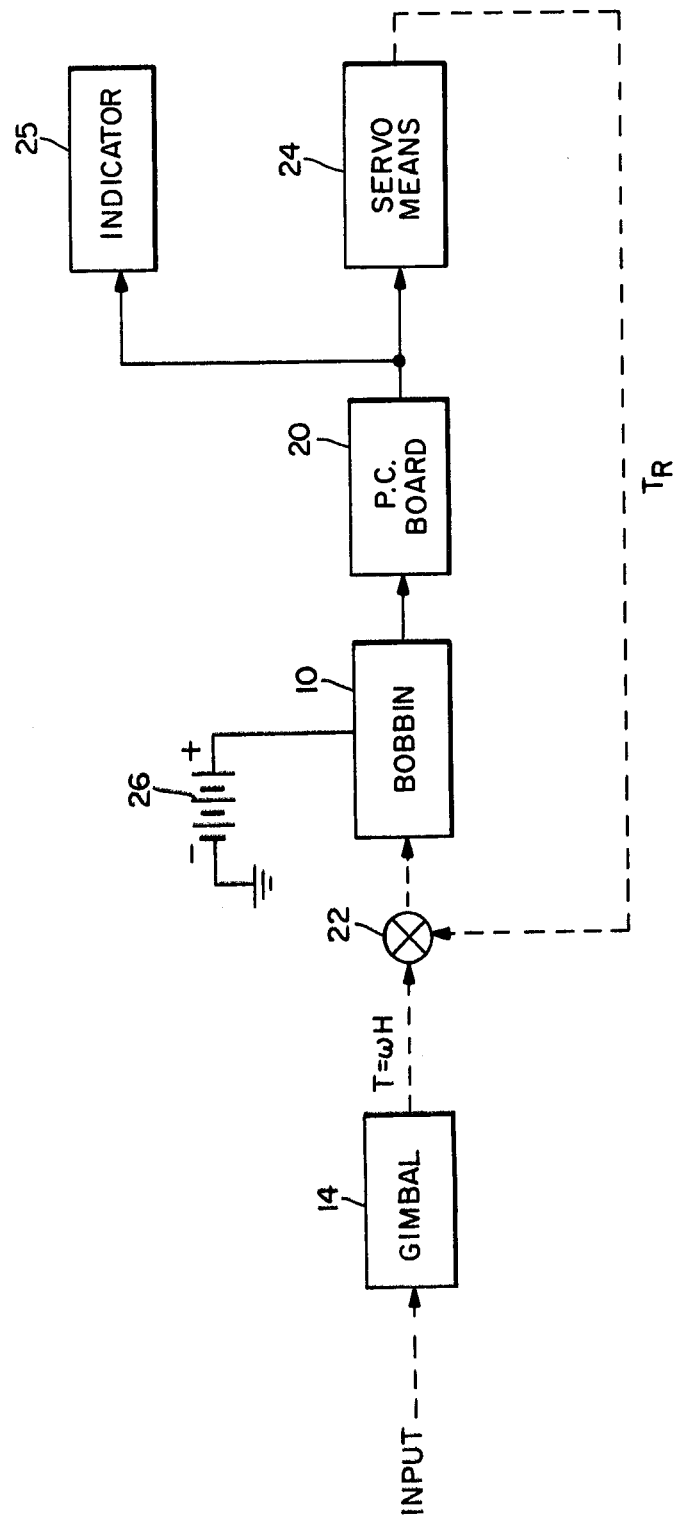
FIG. 3 is a block diagram best illustrating the operation of the invention.

With reference to FIGS. 1 and 2, a permanent magnet is supported within a housing 8. Housing 8 may be of Armco Iron so as to provide a magnetic return path as will become evident. A cap shaped bobbin 10 which may be of aluminum or some other such suitable non-magnetic but electrically conductive material, and which bobbin 10 is supported on an arm 12, fits in spaced relation over magnet 2 so as to surround at least the upper portion of the magnet. Arm 12 is supported on a gimbal 14 and is displaced with the gimbal about an axis X—X. Gimbal 14 may be a rate gyro or accelerometer gimbal as is conventional in the art. Bobbin 10 has a circumferentially extending window or groove 16. Groove 16 carries a winding or coil 18 which is energized by a suitable source of energizing voltage as will be described with reference to FIG. 3.

A printed circuit board 20 of the type conventional in the art is suitably mounted atop housing 8 in spaced relation to top surface 11 of bobbin 10. The arrangement is such that surface 11 of bobbin 10 and circuit portion or pad 21 of circuit board 20 form the plates of a variable capacitor, the capacitance thereof varying with displacement of bobbin 10 about axis X—X.

In the embodiment of the invention of FIG. 1, there is shown a dual bobbin arrangement wherein corresponding elements carry corresponding numerals with the suffix designation A. The arrangement of the invention will work equally as well with a single or double bobbin arrangement as will be hereinafter discussed.

OPERATION OF THE INVENTION

With the arrangement as shown in FIGS. 1 and 2, when bobbin 10 is displaced with gimbal 14 about axis X—X, the capacitance formed by bobbin surface 11 and circuit pad 21 changes. The circuitry included on circuit board 20 responds to the capacitance change to provide a usable signal corresponding to the rate or acceleration of the condition, as the case may be.

Upon energization of bobbin winding 16, a force is created due to the magnetic interaction of the winding and magnet 2. A restoring torque is developed about axis X—X which is a function of the product of the force and the length of arm 12.

Displacement of bobbin 10 in the field of magnet 2 provides a damping effect, the level of which is a function of the rate of displacement of bobbin 10 with respect to magnet 2. In this connection it is noted that the damping effect is basically of the eddy current type and is proportional to the current flow through bobbin 10.

In regard to the configuration of FIG. 1, wherein two bobbins 10 and 10A are symmetrically arranged, two variable capacitors are thus provided in an electrical bridge configuration, and an electrical output corresponding to the sensed condition results from the unbalanced bridge condition. In this connection it is noted that the electrical bridge configuration referred to may be of a conventional type similar to that disclosed at pages 276–277 and shown in FIG. 6–24 of *Electronics for Scientists*, Malmstadt, et al, Benjamin, Inc., N.Y., 1963. Surface 11 and pad 21 and surface 11A and the corresponding pad (not shown) on circuit board 20 provide a pair of variable capacitors while fixed capacitors are included in the circuitry of circuit board 20.

The operation of the invention is best described with reference to the block diagram of FIG. 3. Thus, sensor gimbal 14 receives an inertial input and provides a torque T corresponding to the product of angular rotational rate $\omega$ of the sensing device rotor or mass and the moment of inertial H thereof. This torque is applied to a summing means 22 and summed thereby with the torque provided by a loop closing servo means 24, and which latter torque is a restoring torque designated at $T_R$. The summed torque from summing means 22 displaces bobbin 10 through arm 12 as heretofore noted with respect to FIGS. 1 and 2, and which bobbin windings 18 are energized by a suitable source of direct current shown as a battery 26. The capacitive coupling between bobbin 12 and printed circuit board 20 provides an electrical signal when the bobbin is displaced relative to the circuit board in response to the summation torque, and which electrical signal is applied to servo means 24 including a suitable servo amplifier and coil for providing restoring torque $T_R$ as is well known in the art. In this connection it is noted that servo means 24 may be such as described in commonly assigned U.S. Pat. No. 3,662,595 issued on May 16, 1972 to Charles E. Hurlburt, et al and wherein an amplifier and coil such as may be used in the present invention are shown. The signal may be applied to a suitable indicating means 25 for indicating the condition.

It will now be seen from the aforenoted description of the invention that the heretofore mentioned objects have been satisfied. Sensing, torquing and damping functions are provided in a single structural relationship, thus eliminating the need for separate elements to provide these functions. The functions are provided as a function of the displacement of bobbin 10 relative to circuit board 20 and magnet 2 to provide a more economical and reliable device than has heretofore been known.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:
1. For use with an inertial sensing device, combined means for providing sensing, torquing and damping functions, comprising:
   means coupled to the sensing device and displaced about an axis in response to a sensed condition;
   circuit means arranged in capacitance relation to the displaced means, and displacement of the displaced means relative to the circuit means changing the capacitance as a function of the sensed condition;
   first magnet means;
   second magnet means carried by the displaced means and interacting with the first magnet means for providing a force which displaces the displaced means relative to the first magnet means to develop a restoring torque about the axis;
   the displacement of the displaced means relative to the first magnet means providing a damping effect;
   the means coupled to the sensing device and displaced about an axis in response to a sensed condition includes an arm coupled to the sensing device and a cap shaped member supported at the end of the arm;
   the circuit means is supported in spaced relation to the cap shaped member;
   the first magnet means includes a permanent magnet, with the cap shaped member surrounding in spaced relation at least a part of the permanent magnet; and
   the second magnet means includes a coil wound on the cap shaped member and means for energizing the coil.
2. Means are described by claim 1, wherein:
   the developed restoring torque is a function of the product of the force and the length of the arm.
3. Means as described by claim 1, wherein:
   the damping effect is a function of the rate of displacement of the displaced means relative to the first magnet means.
4. Means as described by claim 1, including:
   a base;
   the circuit means is affixed to the base in spaced relation to the cap shaped member; and
   the permanent magnet of the first magnet means is affixed to the base with the cap shaped member surrounding in spaced relation at least a part of the permanent magnet.
5. Means as described by claim 4, wherein:
   the circuit means is a printed circuit board.
6. For use with an inertial sensing device, combined means for providing sensing, torquing and damping functions, comprising:
   means coupled to the sensing device and displaced about an axis in response to a sensed condition;
   circuit means arranged in capacitance relation to the displaced means, and displacement of the displaced means relative to the circuit means changing the capacitance as a function of the sensed condition;
   first magnet means;
   second magnet means carried by the displaced means and interacting with the first magnet means for providing a force which displaces the displaced means relative to the first magnet means to develop a restoring torque about the axis;
   the displacement of the displaced means relative to the first magnet means providing a damping effect;

the means coupled to the sensing device and displaced about an axis in response to a condition includes an arm centrally coupled to the sensing device;

said means further includes a pair of cap shaped members, each of which is supported at an opposite end of the arm; and the circuit means is arranged with the displaced means in a capacitance bridge configuration.

* * * * *